April 18, 1933.  M. GZUPKAYTIE  1,904,220
VEHICLE SPRING AND SHOCK ABSORBER
Filed June 23, 1931  2 Sheets-Sheet 1
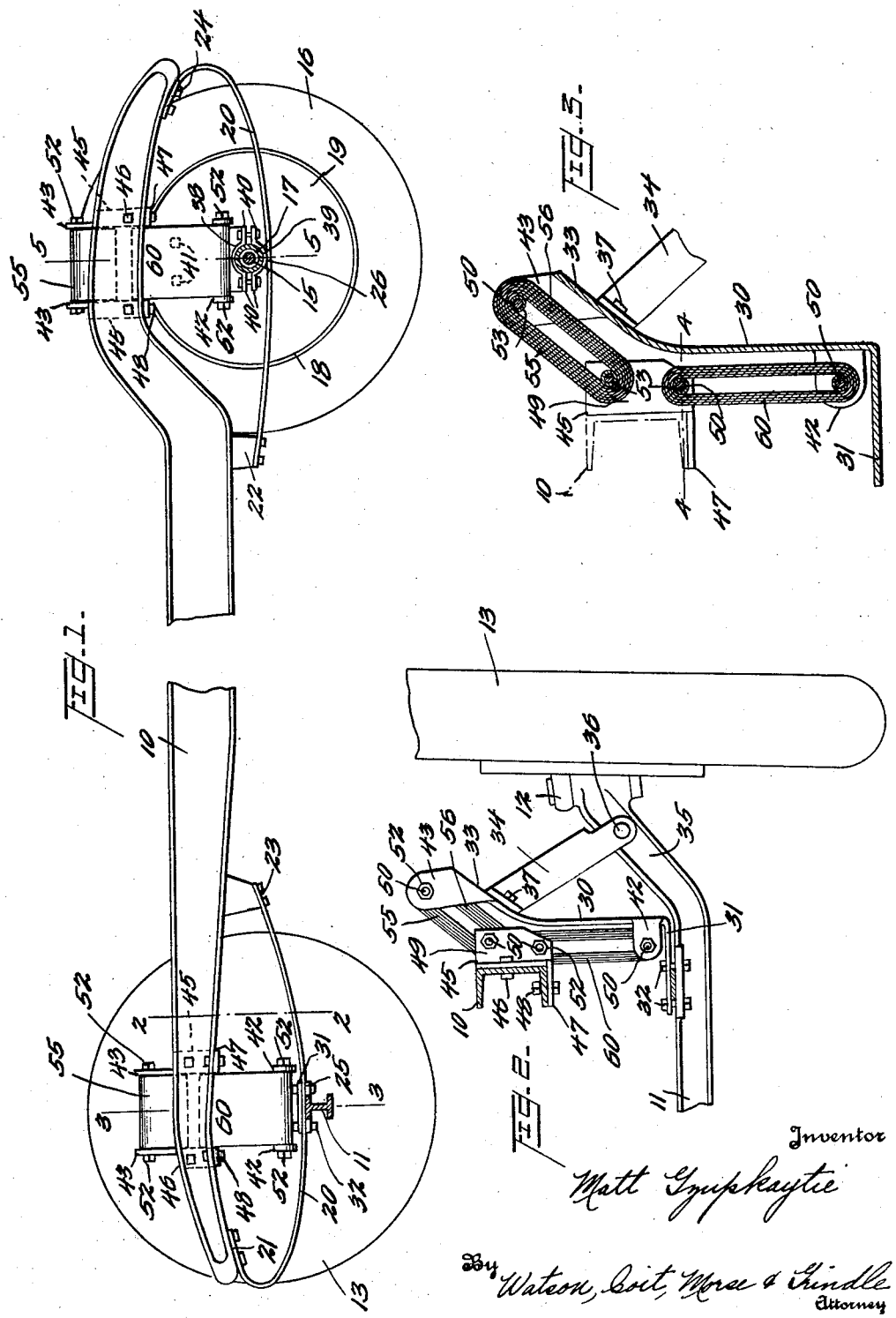

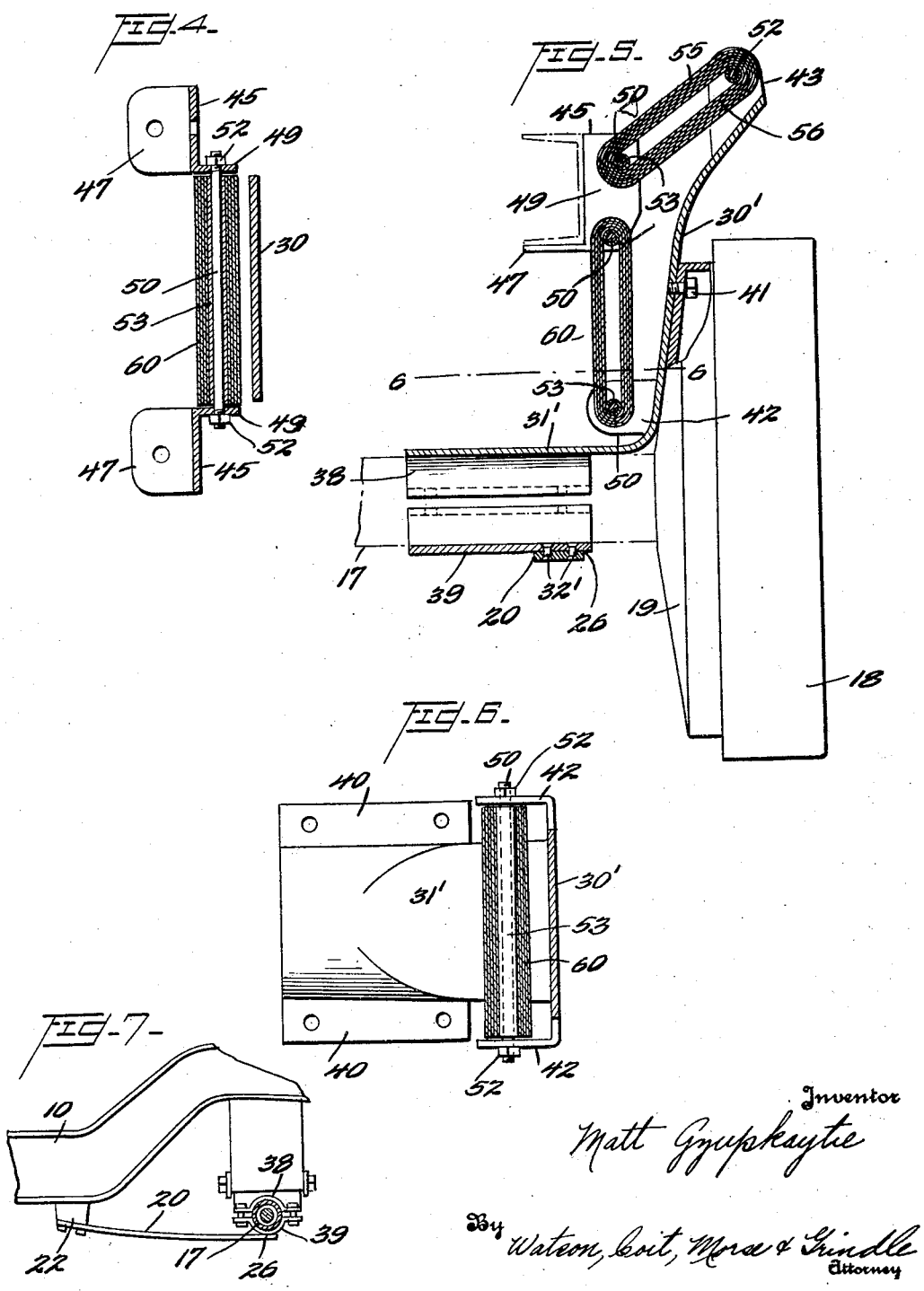

Patented Apr. 18, 1933

1,904,220

UNITED STATES PATENT OFFICE

MATT GZUPKAYTIE, OF BALTIMORE, MARYLAND

VEHICLE SPRING AND SHOCK ABSORBER

Application filed June 26, 1931. Serial No. 547,090.

This invention relates to vehicle springs and shock absorbers which are adapted to provide a resilient suspension means for cushioning the impact and rebound shocks incident to the travel of the vehicle over uneven surfaces.

One of the objects of this invention is to provide a device of this general type in which there are employed, for the purpose of absorbing such shocks, members constructed of a deformable or elastic material, such as rubber or the like.

Another object is the provision of novel connecting and supporting means whereby the resilient members are attached to the chassis and to the axles of the vehicle.

Other objects and features of novelty will be apparent from the following specification when read in connection with the accompanying drawings, in which certain embodiments of my invention are illustrated by way of example.

In the drawings:

Figure 1 is a vertical longitudinal sectional view through the chassis of an automobile looking outwardly toward the wheels on the right-hand side. In this view the spring devices which embody the subject matter of my invention are shown in side elevation;

Figure 2 is a transverse sectional view taken on line 2—2 of Figure 1;

Figure 3 is a vertical sectional view through one of the spring devices as applied to the front axle and taken on line 3—3 of Figure 1;

Figure 4 is a horizontal sectional view taken on line 4—4 of Figure 3;

Figure 5 is a vertical transverse sectional view taken on line 5—5 of Figure 1 through one of the spring devices as applied to a rear axle;

Figure 6 is a horizontal sectional view taken on line 6—6 of Figure 5; and

Figure 7 is a fragmentary view similar to Figure 1 illustrating a modified form of my device.

Referring to the drawings, the numeral 10 denotes one of the channel side beams of the chassis of an automobile to which my invention has been applied. It is, of course, obvious that the novel spring and shock absorbing elements constructed according to the principles of my invention may be applied to any type of vehicle, whether self-propelled or not. The illustrations in the drawings and the descriptions herein are merely exemplary, and various modifications may be made therein without departing from the scope of the invention as defined by the subjoined claims.

The front axle of the vehicle illustrated in the drawings is shown at 11 and has pivoted thereto, as at 12, the front wheel 13. Any suitable or preferred form of steering mechanism may be provided in this connection. The rear axle 15 supported by the driving wheels, one of which is shown at 16, is enclosed by the usual housing 17. As shown in Figure 5, the usual brake drum 18 is provided together with the inner brake drum casing 19.

In lieu of the usual front and rear leaf springs, there is provided, in the present construction, the elements 20, one being disposed at each end of the channel side beams 10, the forward members 20 being secured to the front end of the beams 10, as at 21, and the rear members being secured to the lugs 22 which depend from the rear portions of the beams 10. The rear ends of each of the members 20 are secured to the beams 10 as at 23 and 24 respectively. These members 20 are not designed to support the weight of the vehicle but merely serve as means for maintaining the axles in longitudinally and laterally spaced relation with the chassis of the vehicle. For this purpose a heavy construction is not required, and each of these elements may be formed of a band of steel approximating the size and shape of a single leaf of the leaf spring usually provided at these points. At their approximate mid-points these strips 20 are secured to the axle 11 as shown at 25 and to the rear axle housing as shown at 26.

A modified form of connection is shown in Figure 7, in which the member 20 extends only between the lug 22 and the point 26.

My improved spring devices, while following the same general lines of construction, are subject to slight modifications according to whether they are to be used in connection with the front axle or the rear axle housing of the vehicle. In the case of the front members, shown to best advantage in Figures 2 and 3 of the drawings, there is provided a substantially L-shaped bracket 30, the lower horizontal portion 31 of which is secured to the top of the axle 11 by means of the bolts or other securing elements 32. It will be noted that the spacing members 20 are clamped between the bracket portion 31 and the top surface of the axle, as clearly shown in Figure 2. A brace 34, which is preferably U-shaped in cross-section, extends between the bracket portion 33 and the upwardly bent outer end 35 of the front axle 11. The lower end of the brace 34 is bifurcated and is secured to the axle as at 36. Flanges 37 are provided at the upper end of the brace 34 and are bolted or otherwise secured to the upper portion 33 of the bracket.

The rear brackets 30' are of the same general shape as the front brackets 30 and are provided with the horizontal portions 31' which are curved as at 38 to fit the rear axle housing 17. A complementary clamping member 39 is fitted to the underside of the housing 17 and secured to the portion 31' by means of bolts or any other suitable fastening elements which are adapted to connect the adjacent flanges 40 of the members 31' and 39. The rear members 20 may be secured to these clamping members 39 by means of rivets 32' or any other desired means, or they may be suitably secured to the axle housing 17 itself. Instead of a brace, such as the member 34 provided in connection with the front bracket, the substantially vertical portions of the rear brackets 30' are shaped to the contour of the inner surface of the brake drum casing 19 and are secured thereto by means of the bolts 41. In practically all other respects the front and rear brackets 30 and 31' are similarly constructed, and this common construction will now be described.

Upon each side of the upstanding portions of the brackets 30 and 30', at the lower ends thereof, are provided the inwardly directed ears 42. The upper outwardly bent portions 33 of the brackets are provided with the upstanding spaced ears 43.

A pair of brackets 45 is secured to the body portion of the beam 10 by means of suitable fastening elements 46. The brackets 45 are provided with horizontal flanges 47 which are adapted to underlie the bottom flanges of the channel 10 and to be secured thereto by the fastening means 48. Spaced outwardly-directed flanges 49 are formed upon the brackets 45 and are each adapted to be disposed in transverse alignment with one of the ears 42 and 43. Each of the ears 42 and 43 and the upper and lower portions of each of the flanges 49 of the brackets 45 are provided with perforations through which are adapted to pass the pins 50, which are adapted to connect the flanges 49 and the ears of each pair. Outwardly of these ears and flanges, the pins 50 are provided with heads, nuts, or other abutments, as for example at 52, to retain them in place. Loosely and rotatably disposed upon the intermediate portions of the pin 50 are the sleeves 53.

As a means for suspending the beam 10 of the chassis from the brackets 30 and 31' there are provided the elastic straps 55, which are made in the form of loops and are adapted to connect the pins 50 which extend between the upper ears 43 and between the upper portions of the brackets 45. These straps or loops 55 are preferably built up of concentric layers of sheet rubber to form a strong multiple ply or laminated structure. The layers 56 may be continuous, having their ends secured to prevent unwinding, or they may be formed of a plurality of separate individual loops graduated in size from the inner surface of the straps 55 to the outer surface thereof, as in the preferred embodiment illustrated in the drawings.

As a means for checking the rebound of the vehicle, the pins 50 connecting the lower ears 42 and the lower portions of the flanges 49 of the bracket 45 are connected by a similar loop or band 60 which is of the same construction as the bands 55 but which may be formed of fewer laminations since it will not have to withstand as great shocks as the bands 55 which serve to support the weight of the vehicle from the brackets.

It will be apparent from the foregoing description and the accompanying illustrations that there is provided, by means of the present invention, an extremely efficient spring suspension and shock absorber or rebound check, by means of which easier riding qualities of any type of vehicle may be attained. The front and rear brackets 30 and 30' are of substantial construction, being firmly secured and braced in their respective axles and housings, and the members 20 cooperate with the resilient suspension to prevent undue lateral and longitudinal sway of the chassis with respect to the supporting axle.

Having thus described the invention, what is claimed as new and desired to be secured by Letters Patent is:

1. In a combined vehicle spring and shock absorber, the combination of an upstanding bracket mounted at its lower end upon one end of an axle of a vehicle, a brace between said bracket and an outer portion of said axle, and an elastic strap connecting the upper end of said bracket with the chassis of the vehicle.

2. In a combined vehicle spring and shock absorber, the combination of an upstanding bracket mounted at its lower end upon one end of an axle of a vehicle, a brace between said bracket and an outer portion of said axle, an elastic strap connecting the upper end of said bracket with the chassis of the vehicle, and an elastic rebound shock absorbing member connecting the lower end of said bracket with said chassis.

3. In a combined vehicle spring and shock absorber, the combination of an upstanding bracket mounted at its lower end upon one end of the rear axle housing of a vehicle and secured at an intermediate portion to the brake drum housing, and an elastic supporting element connecting the upper end of said bracket with the chassis of the vehicle.

4. In a combined vehicle spring and shock absorber, the combination of an upstanding bracket mounted at its lower end upon one end of the rear axle housing of a vehicle and secured at an intermediate portion to the brake drum housing, an elastic supporting element connecting the upper end of said bracket with the chassis of the vehicle, and an elastic rebound checking member connecting said chassis to the lower end of said bracket.

5. In a combined vehicle spring and shock absorber, in combination, an upstanding bracket mounted on the axle of a vehicle, a bracket secured to the chassis of the vehicle and normally disposed adjacent to and intermediate the ends of said first named bracket, a rubber strap connecting said second named bracket with the upper end of said first named bracket, and a second rubber strap connecting said second named bracket with the lower portion of said first named bracket.

6. In a combined vehicle spring suspension and shock absorber, in combination, an upstanding bracket mounted upon an axle of said vehicle and provided with a pair of lugs at the top and bottom ends thereof, a sleeved pin connecting the lugs of each pair, a pair of brackets adapted to be secured to the channel beams of the chassis of said vehicle, each of said last named brackets being provided with an outwardly projecting flange, said flanges being connected by a pair of sleeved pins, and extensible laminated rubber loops connecting the pins of the chassis brackets with the upper and lower pins of the upstanding bracket respectively.

In testimony whereof I hereunto affix my signature.

MATT GZUPKAYTIE.